(12) United States Patent
Hiel

(10) Patent No.: US 7,658,042 B2
(45) Date of Patent: Feb. 9, 2010

(54) FIRE-PROTECTION WALLS OF CEMENTITIOUS COMPOSITE MATERIALS

(75) Inventor: Clement Hiel, Rancho Palos Verdes, CA (US)

(73) Assignee: Composite Support & Solutions, Inc., Rancho Palos Verdes, CA (US)

( * ) Notice: Subject to any disclaimer, the term of this patent is extended or adjusted under 35 U.S.C. 154(b) by 0 days.

(21) Appl. No.: 11/666,197

(22) PCT Filed: Oct. 25, 2005

(86) PCT No.: PCT/US2005/038674

§ 371 (c)(1),
(2), (4) Date: Apr. 24, 2007

(87) PCT Pub. No.: WO2006/047644

PCT Pub. Date: May 4, 2006

(65) Prior Publication Data

US 2008/0134628 A1     Jun. 12, 2008

Related U.S. Application Data

(60) Provisional application No. 60/622,286, filed on Oct. 25, 2004.

(51) Int. Cl.
*E04B 1/00* (2006.01)
*E06B 1/04* (2006.01)

(52) U.S. Cl. .................. 52/289; 52/206; 52/233; 52/762; 52/764; 181/284; 181/285; 181/286

(58) Field of Classification Search ............. 52/289, 52/320, 206, 232, 308, 476, 241, 393, 233, 52/317, 762, 764, 775–780, 783.13; 181/284–286
See application file for complete search history.

(56) References Cited

U.S. PATENT DOCUMENTS

| | | | | |
|---|---|---|---|---|
| 1,843,112 A | * | 2/1932 | Denison | 52/289 |
| 2,324,706 A | * | 7/1943 | Jacobson | 181/285 |
| 4,018,983 A | | 4/1977 | Pedlow | |
| 4,056,161 A | * | 11/1977 | Allen, Jr. | 181/290 |
| 4,084,367 A | * | 4/1978 | Saylor et al. | 428/113 |
| 4,143,495 A | * | 3/1979 | Hintz | 52/145 |
| 4,325,457 A | * | 4/1982 | Docherty et al. | 181/210 |

(Continued)

FOREIGN PATENT DOCUMENTS

EP     0191823 B1     8/1986

(Continued)

OTHER PUBLICATIONS

Abstract of JP02180737A in the name of Takagi, et al.

(Continued)

*Primary Examiner*—Richard E Chilcot, Jr.
*Assistant Examiner*—Mark R Wendell
(74) *Attorney, Agent, or Firm*—Christie, Parker & Hale, LLP.

(57) ABSTRACT

A highly protective firewall (13) supported between upstanding columns or beams (15). The firewall is made of an inorganic cementitious material which is preferably inorganic phosphate cement. In one form, the firewall comprises a group of vertically stacked panels (14) made of such material, and the panels are in turn formed by a plurality of elongated and vertically stacked hollow members (21) of the same material.

19 Claims, 5 Drawing Sheets

U.S. PATENT DOCUMENTS

| | | | |
|---|---|---|---|
| 4,349,605 A | 9/1982 | Biggs et al. | |
| 4,419,535 A * | 12/1983 | O'Hara | 174/505 |
| 4,578,913 A | 4/1986 | Eich | |
| 4,838,524 A * | 6/1989 | McKeown et al. | 256/24 |
| 4,899,498 A * | 2/1990 | Grieb | 52/144 |
| 5,268,540 A * | 12/1993 | Rex | 181/210 |
| 5,272,284 A * | 12/1993 | Schmanski | 181/210 |
| 5,309,690 A * | 5/1994 | Symons | 52/309.9 |
| 5,406,039 A * | 4/1995 | Rerup et al. | 181/210 |
| 5,426,267 A * | 6/1995 | Underhill et al. | 181/210 |
| 5,524,412 A | 6/1996 | Corl | |
| 5,539,163 A * | 7/1996 | Anderson et al. | 181/210 |
| 5,553,430 A * | 9/1996 | Majnaric et al. | 52/236.8 |
| 5,641,950 A * | 6/1997 | Kotter | 181/285 |
| 5,681,640 A | 10/1997 | Kiser | |
| 5,710,202 A | 1/1998 | Kuckro | |
| 5,739,464 A | 4/1998 | Adkins et al. | |
| 5,822,935 A | 10/1998 | Mitchell et al. | |
| 5,845,443 A | 12/1998 | Wirkus et al. | |
| 5,959,265 A * | 9/1999 | Van Ligten | 181/286 |
| 5,984,044 A * | 11/1999 | Christensen | 181/210 |
| 5,985,385 A | 11/1999 | Gottfried | |
| 6,016,887 A * | 1/2000 | Underhill et al. | 181/210 |
| 6,074,714 A | 6/2000 | Gottfried | |
| 6,096,816 A | 8/2000 | Kuckro | |
| 6,103,007 A | 8/2000 | Wu et al. | |
| 6,195,253 B1 | 2/2001 | Fahlgren et al. | |
| 6,209,680 B1 * | 4/2001 | Perdue | 181/295 |
| 6,233,137 B1 | 5/2001 | Kolos et al. | |
| 6,390,135 B1 * | 5/2002 | Shimizu | 138/89 |
| 6,421,968 B2 | 7/2002 | Degelsegger | |
| 6,629,392 B1 | 10/2003 | Harrel et al. | |
| 6,837,013 B2 * | 1/2005 | Foderberg et al. | 52/356 |
| 6,848,227 B2 * | 2/2005 | Whitty | 52/232 |
| 6,855,393 B1 | 2/2005 | Ayres | |
| 6,899,200 B1 * | 5/2005 | Roberts et al. | 181/285 |
| 7,104,720 B2 * | 9/2006 | Humphries et al. | 404/6 |
| 2002/0144861 A1 * | 10/2002 | Wisniewski | 181/285 |
| 2003/0019170 A1 * | 1/2003 | Donnelly | 52/144 |
| 2004/0128947 A1 * | 7/2004 | Ito et al. | 52/782.1 |
| 2004/0176004 A1 | 9/2004 | Fyfe | |
| 2006/0053710 A1 * | 3/2006 | Miller et al. | 52/232 |

FOREIGN PATENT DOCUMENTS

| | | |
|---|---|---|
| JP | 2-180737 | 7/1990 |
| JP | 2-296946 | 12/1990 |
| JP | 8-93076 | 4/1996 |
| JP | 8-93077 | 4/1996 |

OTHER PUBLICATIONS

Patent Abstracts of Japan 02-296946, published Dec. 7, 1990 in the name of Higuchi, et al.
Patent Abstracts of Japan 08-093076, published Apr. 9, 1996 in the name of Takahashi, et al.
Patent Abstracts of Japan 08-093077, published Apr. 9, 1996 in the name of Takahashi, et al.
International Search Report dated Jun. 5, 2006 for PCT Appl. No. PCT/US05/38674.

* cited by examiner

FIRE-PROTECTION WALLS OF CEMENTITIOUS COMPOSITE MATERIALS

CROSS-REFERENCE TO RELATED APPLICATION(S)

This application is a National Phase Patent Application of International Application No. PCT/US2005/038674, filed on Oct. 25, 2005. This application claims the benefit of U.S. Provisional Application No. 60/622,286 filed on Oct. 25, 2004.

BACKGROUND OF THE INVENTION

This invention relates to an improved firewall for protection of high-value and essential equipment such as high-voltage transformers in an electrical utility station. Transformers of this type typically contain a flammable oil which can ignite into a dangerous fire in the event of a major short circuit or other equipment failure or environmental problems. Such fires can reach very high temperatures which can spread the fire to adjacent equipment such as other transformers, putting in jeopardy the ability of the utility service to provide electrical energy.

The improved firewall is made of cementitious inorganic composite material which has good insulation and fire-resistant properties. In a presently preferred form the composite material is an inorganic phosphate cement as described in U.S. Pat. No. 6,103,007, the disclosure of which is incorporated herein by reference. The wall is preferably made in sections which are supported between spaced-apart vertically upstanding girders such as steel I beams. The beams are preferably protected by overlying sheets of glass-fiber fabric impregnated with the cementitious material.

SUMMARY OF THE INVENTION

A firewall system comprising an upright firewall of inorganic cementitious material which is preferably inorganic phosphate cement. The firewall is supported between upright spaced-apart members such as I beams. The firewall is preferably made up of vertically stacked panels of such material, and in one form, the panels are hollow with air-filled interior spaces.

DETAILED DESCRIPTION OF THE PREFERRED EMBODIMENTS

Figure 1:
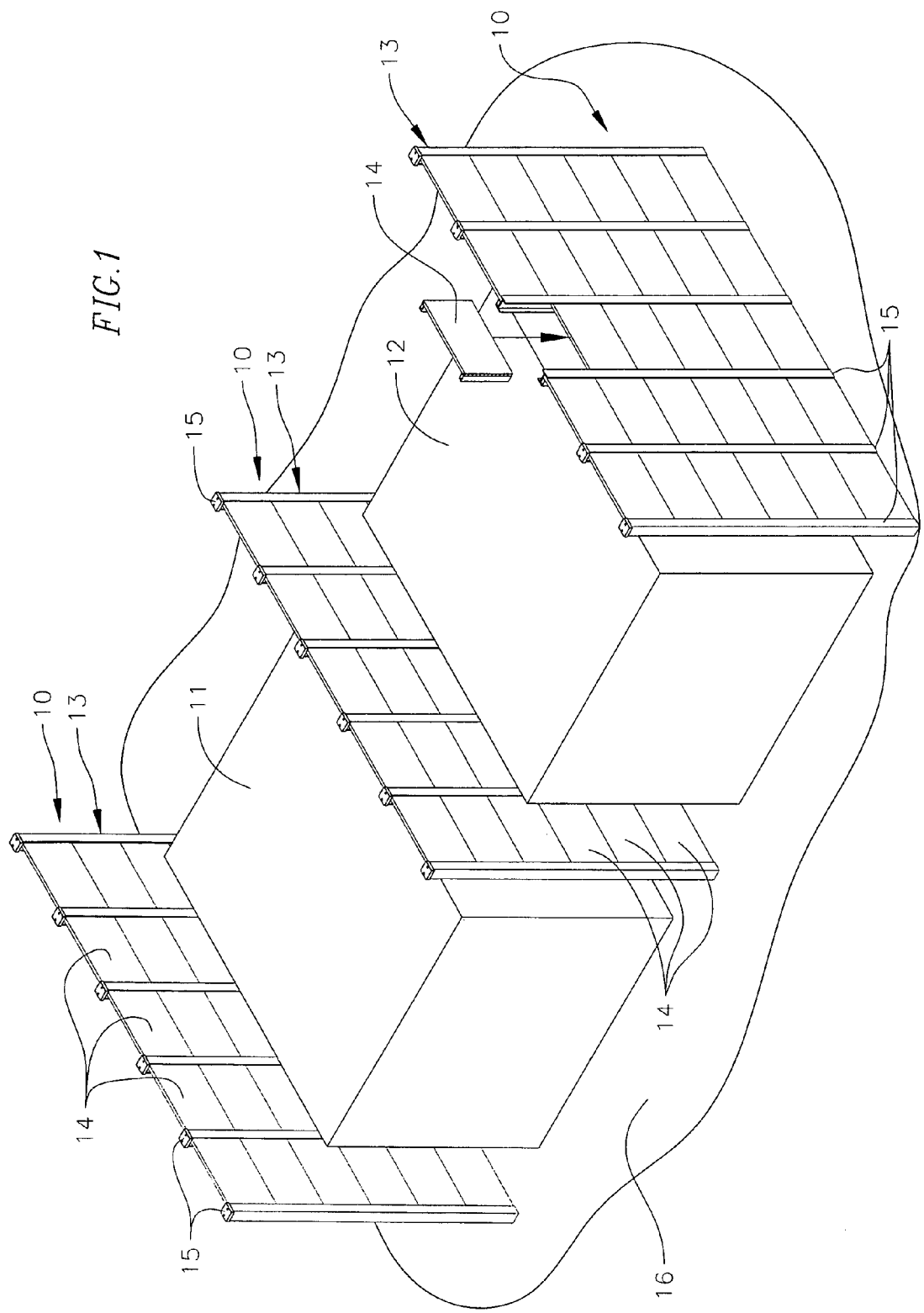
FIG. 1 is a perspective view of three spaced-apart firewalls positioned on opposite sides of equipment to be protected.

Referring to FIG. 1, three spaced-apart firewall systems 10 are shown on opposite sides of equipment such as transformers 11 and 12 (shown simply as blocks) to be protected. Each system has a firewall 13 which preferably comprises a vertically stacked plurality of firewall panels 14. Firewall 13 is supported between girders such as vertically upstanding and spaced-apart I beams 15 having lower ends embedded in a concrete base 16 on which the transformers are mounted.

Figure 2:
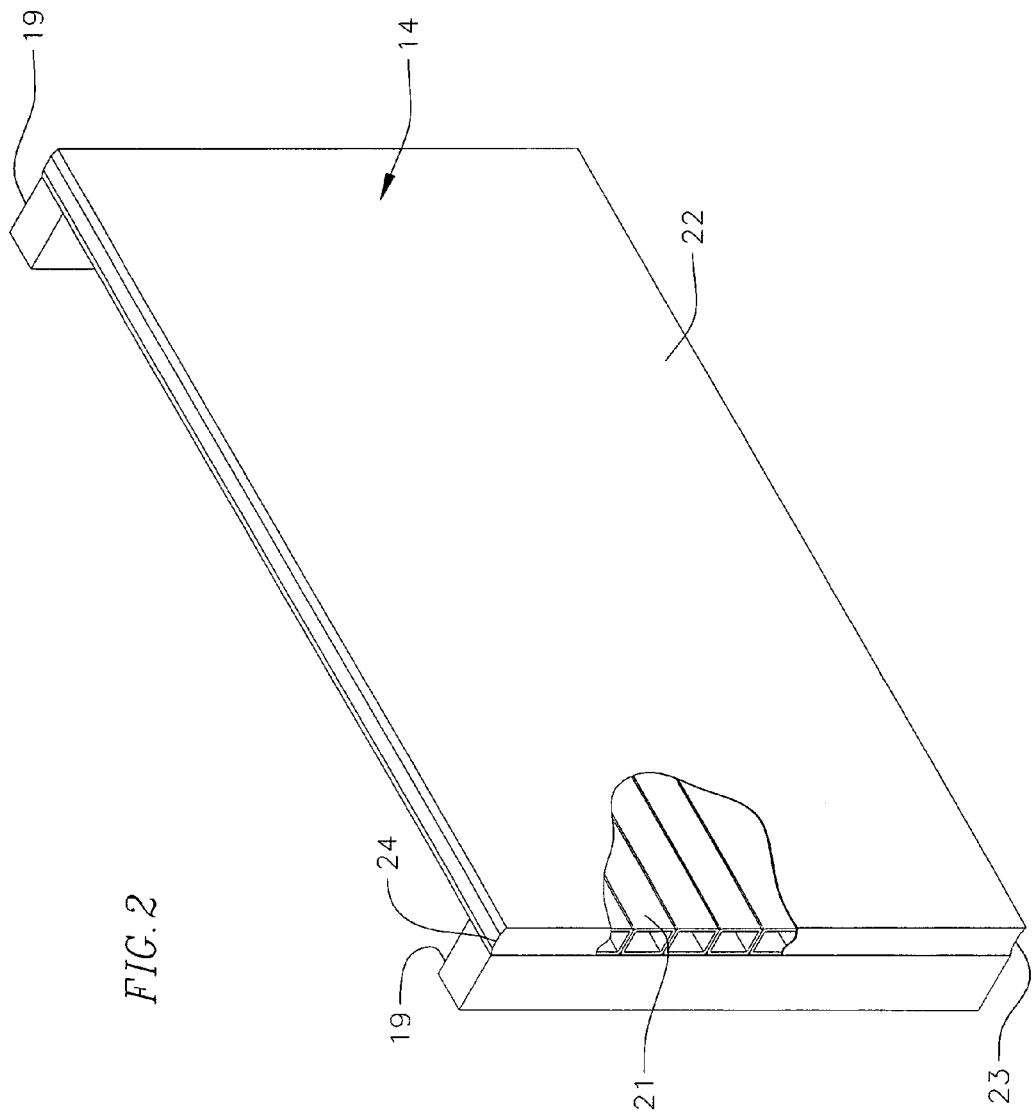
FIG. 2 is a perspective view of a panel, partly broken away, the firewall having a plurality of stacked such panels.
Figure 3:
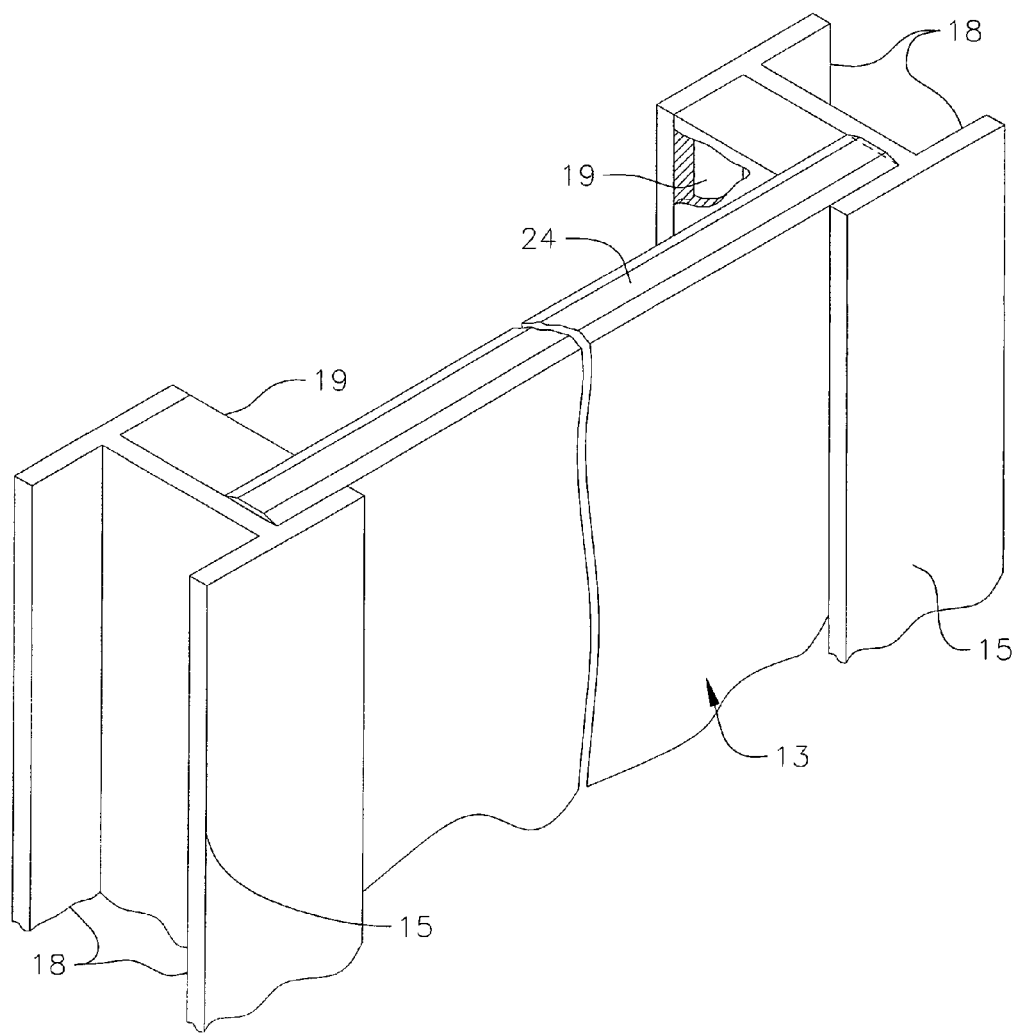
FIG. 3 is a top perspective view of the firewall.

In a typical configuration, firewall panels 14 are about 5 feet high, 8½ feet wide, and 3½ inches thick. I beams 15 typically have flanges 18 which are spaced apart by 8 to 12 inches as shown in FIG. 3, and as shown in FIG. 2, the panels are provided with spacers 19 at opposite ends so the panels make a snug slip fit between the flanges when lowered between the I beams. The spacers are preferably made of the same fire-resistant cementitious material from which the panels are made. The firewall can be as tall as necessary to shelter the equipment being protected, and are typically 20 to 40 feet high, thus using four to eight stacked panels.

Figure 4:
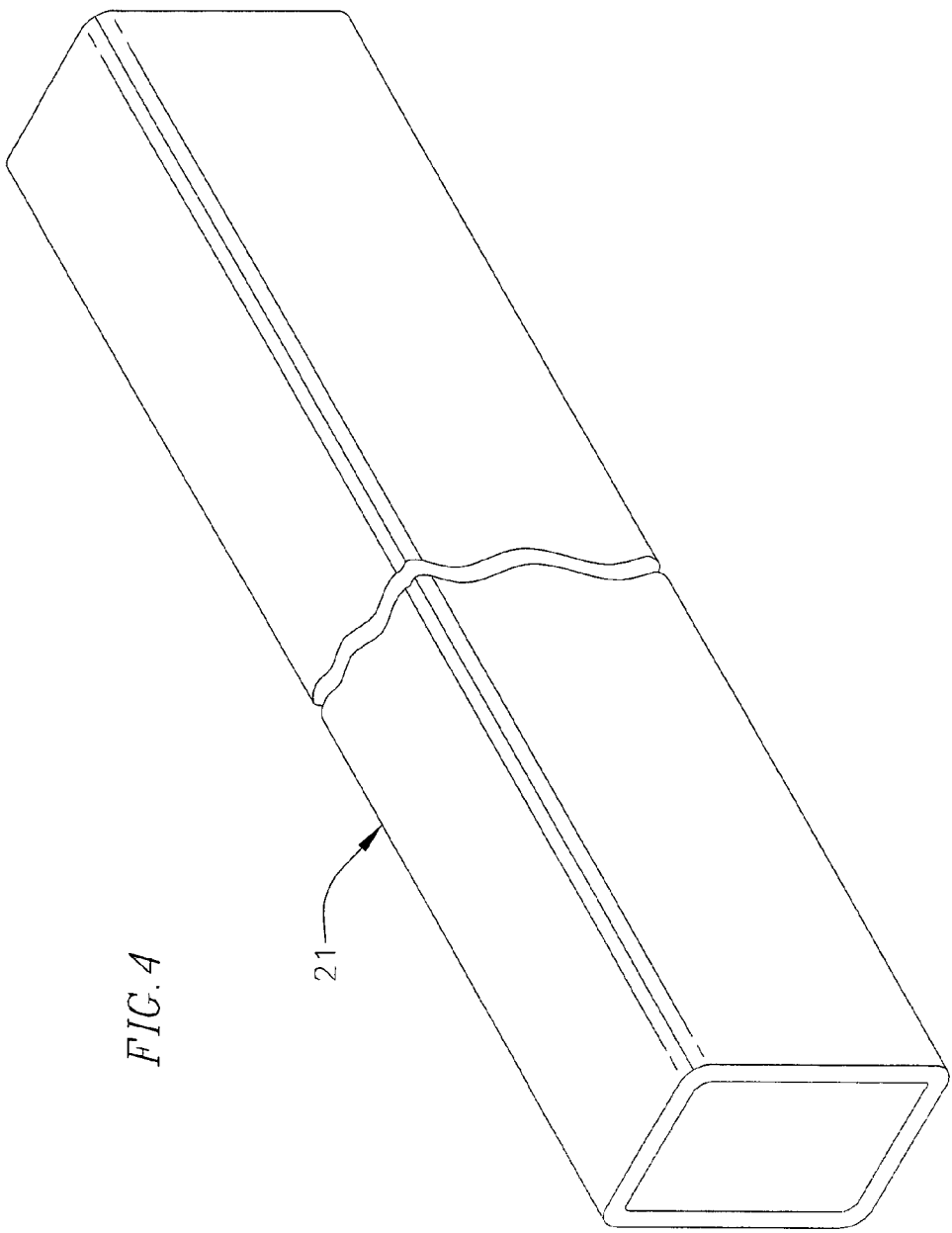
FIG. 4 is a perspective view of an elongated hollow member of cementitious material.

In a presently preferred form the firewall panels 14 comprise a vertically stacked series of elongated members 21 which are hollow, and of rectangular cross section as shown in FIGS. 2 and 4. Members 21 are made a glass-fiber fabric which is impregnated with inorganic cementitious material to provide a wall thickness of about ¼ inch. The outside dimensions of the member are typically about 3½ by 5 inches.

While various inorganic cementitious materials can be used, a preferred material is an inorganic phosphate cement as described in the aforementioned U.S. Pat. No. 6,103,007. This material has a long pot life after mixing to provide ample time for impregnating the glass-fiber fabric, is highly resistant to fire, and has good insulating properties. Each member 21 can be formed by wrapping the impregnated fabric around a wood core or mandrel which is withdrawn after the cementitious material has hardened.

A plurality (typically twelve) of members 21 are then vertically stacked together, and wrapped with an outside layer 22 of glass-fiber fabric impregnated with the cementitious material to form a panel 14. To provide snug nesting of vertically stacked panels, a lower end 23 of each panel is slightly concave, and an upper end 24 is slightly convex as shown in FIG. 2.

Figure 5:
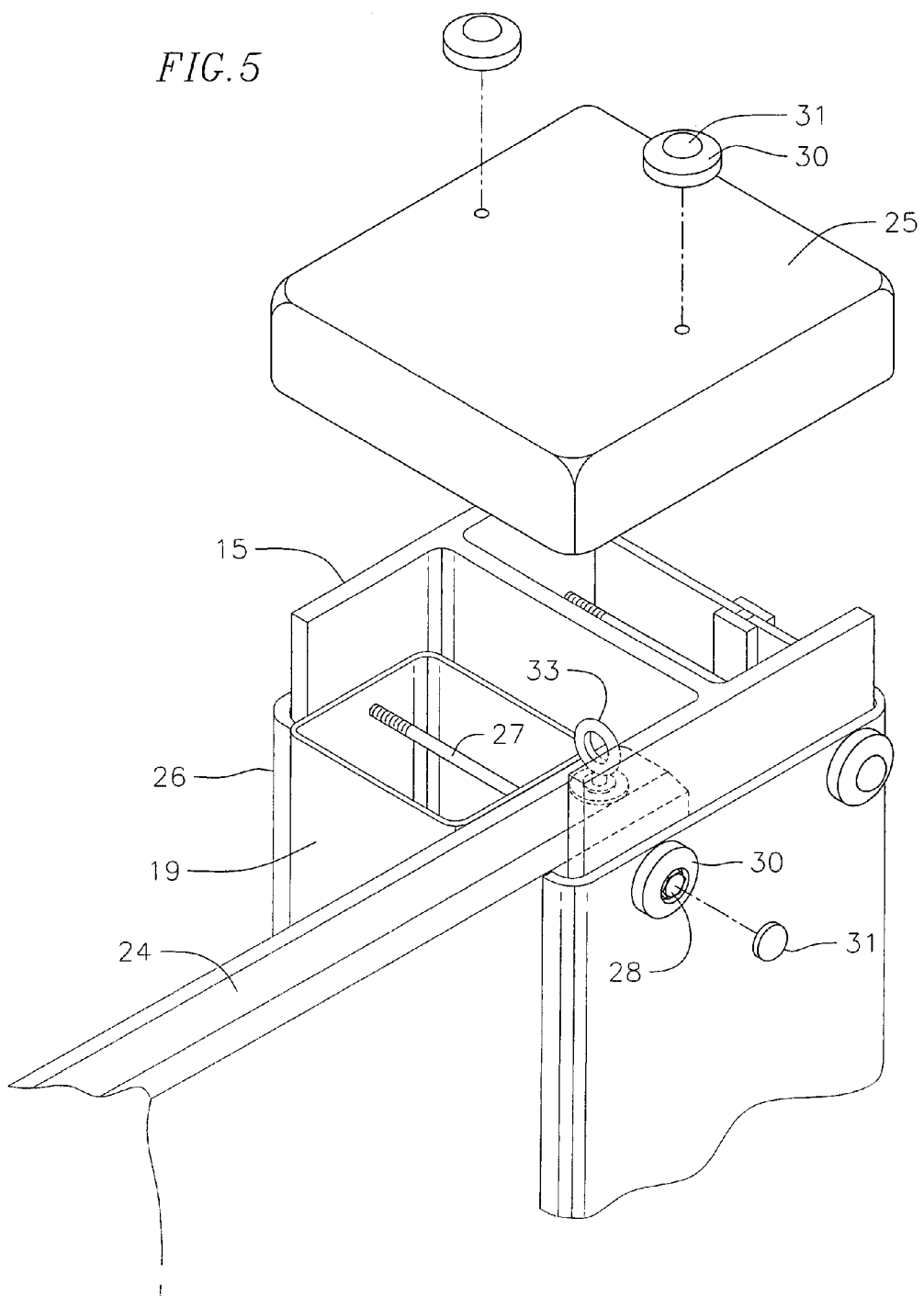
FIG. 5 is an exploded perspective view of an upper end of the firewall system.

As shown in FIG. 5, I beams 15 are also covered with a cap 25 and plates 26 of the cementitious material. The panels are vertically secured by threaded fasteners 27 extending through the I beam flanges and panels. Each fastener has a head 28 which is surrounded by a washer 30 of the cementitious material, and after the fastener is secured, the head is covered by a plug 31 made of the same material, and fitted into the washer. Similar protection is provided for a nut on the opposite end of the fastener. Hooks 33 may be provided in the upper end of the firewall to enable lifting during installation.

The inorganic cementitious firewall can be made in other forms such as plates which are spaced apart by bonded or integrally formed cross members or fins. The resulting air-filled spaces provide good temperature insulation, but can also be filled with a form material (preferably closed cell) of a foamed version of the same inorganic cementitious material.

There has been described a new firewall system having good heat-insulating properties, and a high degree of fire protection for valuable equipment such as electrical transformers. The system is strong enough to handle high wind loads, and is relatively simple to assemble and erect.

What is claimed is:

1. A firewall system comprising an upright firewall supported between spaced-apart vertical beams, the firewall being made of an inorganic cementitious material, the firewall comprising a vertically stacked series of panels, the panels each comprising a plurality of stacked elongated rectangular members and an outer glass fiber fabric layer covering the elongated rectangular members, wherein the panels are individually and independently secured along the sides of the panels to the vertical beams.

2. The system defined in claim 1, wherein the cementitious material is inorganic phosphate cement.

3. The system of claim 2 in which the firewall has sealed interior air-filled spaces.

4. The system of claim 3, in which the beams are metal I beams having spaced-apart flanges, and the panels make a snug slip fit between the flanges.

5. The system of claim 4, wherein the panels have spacers at opposite ends to provide said slip fit.

6. The system of claim 5, wherein exposed surfaces of the metal I beams are covered by plates of said inorganic phosphate cement.

7. The system of claim 6, wherein the panels are secured to the beams by metal fasteners having exposed surfaces which are covered with fittings of said inorganic phosphate cement.

8. The system of claim 1, wherein the elongated rectangular members are hollow, stacked vertically, and extend horizontally across a length of each of the panels.

9. The system of claim 8, wherein the elongated rectangular members are made of said inorganic cementitious material.

10. The system of claim 9, wherein the elongated rectangular members further comprise a foam material in the hollow.

11. The system of claim 1, wherein the outer glass fiber fabric layer is impregnated with cementitious material.

12. The system of claim 1, wherein each of the panels has a concave lower end and a convex upper end.

13. The system of claim 5, wherein top surfaces of the metal I beams are covered by caps of said inorganic phosphate cement.

14. The system of claim 1, wherein the firewall includes fibrous strength reinforcing material.

15. A firewall comprising:
a plurality of vertically aligned beams; and
a plurality of panels stacked vertically between each of the vertically aligned beams, wherein each of the panels comprises:
  a plurality of vertically stacked elongated and hollow rectangular members;
  an outer glass fiber fabric layer covering the plurality of rectangular members; and
  spacers attached and extending perpendicularly along the transverse axis on both sides of each of the panels,
wherein the rectangular members and outer glass fiber fabric layer are made of glass fiber fabric impregnated with inorganic cementitious material; and
wherein each of the panels has a concave lower end and a convex upper end.

16. The firewall of claim 15, further comprising:
plates covering sides of the beams, and
caps covering a top of the beams,
wherein the plates and the caps are made of said inorganic cementitious material.

17. The firewall of claim 15, wherein the rectangular members further comprise a foam material in the hollow.

18. The firewall of claim 15, wherein the beams are I-beams and the spacers and ends of the panels fit within flanges of the I-beams.

19. The firewall of claim 18, further comprising:
threaded fasteners securing the panels to the I-beams, each fastener having a head;
washers surrounding each head of the fasteners, the washers being made of said inorganic cementitious material; and
plugs secured to the washers to cover the head of the fasteners, the plugs being made of said inorganic cementitious material.

* * * * *